United States Patent

Brunie et al.

[15] 3,689,534
[45] Sept. 5, 1972

[54] NEW FORMLOXYALKANALS AND PROCESS FOR THEIR PREPARATION

[72] Inventors: Jean-Claude Brunie; Michel Constantini; Noel Crenne, all of Lyon; Michel Jouffret, Villeurbanne, all of France

[73] Assignee: Rhone-Poulene S.A., Paris 8e, France

[22] Filed: Oct. 9, 1969

[21] Appl. No.: 865,166

[52] U.S. Cl. ............... 260/488 F, 260/413, 260/415, 260/535 R, 260/586 A, 260/633 A
[51] Int. Cl. .................................................. C07c 67/00
[58] Field of Search .................................. 260/488 F

[56] References Cited

UNITED STATES PATENTS 3,287,400   11/1966   Hagemeyer et al. ........ 260/488
2,717,264   9/1955    Rust et al. .................... 260/488
3,492,339   1/1970    Hawkins et al. ............. 260/488

OTHER PUBLICATIONS

Chem. Abstracts, 54:18347F
Chem. Abstracts, 68:104518V

*Primary Examiner*—Vivian Garner
*Attorney*—Stevens, Davis, Miller & Mosher

[57] ABSTRACT

ω-Formyloxyalkanals of formula $HCO.O(CH_2)_nCHO$ in which $n$ represents an integer from 5 to 11 are prepared by reacting formic acid with a cycloalkyl hydroperoxide of the formula

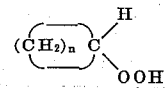

in which $n$ is an integer from 5 to 11. They are valuable intermediates, for example, in the preparation of α,ω-alkanediols and ω-hydroxyalkanoic acids, which can be used to prepare fibers and resins.

4 Claims, No Drawings

NEW FORMLOXYALKANALS AND PROCESS FOR THEIR PREPARATION

This invention relates to new acyloxyalkanals and their production.

The present invention provides the ω-formyloxyalkanals of the general formula:

in which $n$ represents an integer from 5 to 11.

These ω-formyloxyalkanals can be prepared by the action of formic acid on a cycloalkyl hydroperoxide of formula

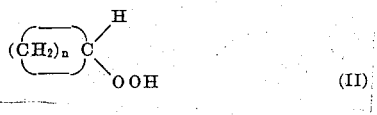

in which $n$ has the significance given above. This result is surprising as it has been reported (Pritzkow et al., Ber. 89, 2321 (1956) ) that when cyclohexyl hydroperoxide is decomposed in acetic acid, 6-acetoxy-hexanal is not produced.

The hydroperoxides of formula (II) can be obtained from the corresponding cycloalkanols or by oxidation of the cycloalkanes from which they are derived, in the liquid phase, without a catalyst, by means of a gas containing molecular oxygen. For example, cyclohexane can be oxidized according to the process described in French Pat. No. 1,404,723, and its higher homologues according to the process described in French Pat. No. 1,429,569, and the resulting hydroperoxide can then be purified according to the usual processes, e.g. converting it to the sodium salt and treating this with carbon dioxide.

Formic acid which does not contain more than 5 percent by weight of water is preferably used, especially anhydrous formic acid.

The reaction can suitably be carried out at a temperature between 50° C and the boiling point of formic acid.

A preferred method comprises gradually introducing the hydroperoxide into the formic acid which has beforehand been heated to between 50° C and its boiling point. Since the reaction is exothermic, it is convenient to keep the reaction temperature between the limits indicated above by an appropriate flow rate of the hydroperoxide. In general the formic acid is used as a diluent and amounts ranging from 5 moles to 25 mols per mol of hydroperoxide are very suitable.

When the hydroperoxide has been admixed, it is advisable to remove the formic acid, if any, which has not taken part in the reaction from the reaction mixture because its presence can be harmful to the stability of the resulting formyloxyalkanal. This removal can advantageously be carried out by adding a hydrocarbon such as benzene, toluene, pentane, hexane, heptane or cyclohexane, usually after cooling the reaction mixture, and distilling off a binary azeotrope of the hydrocarbon and formic acid.

The formyloxyalkanal formed can thereafter be isolated from the residual mixture according to the usual methods, for example by fractionnal distillation, preferably under reduced pressure.

The ω-formyloxyalkanals according to the invention are very valuable auxiliary materials for synthesis. 8-formyloxy-octanal can advantageously replace its acetoxylated homologue in the preparation of trans 10-hydroxy-decen-2-oic acid, which is a constituent of the royal jelly of bees. The ω-formyloxyalkanals can also be converted into base products for the production of resins and synthetic fibers. They can for example be converted into α,ω- alkanediols or into ω-hydroxyalkanoic acids, by reduction or oxidation of the aldehyde group respectively followed by saponification or alcoholysis of the ester group, and these various operations can be carried out by applying any method known in these fields.

The Examples which follow illustrate the invention. The ω-formyloxyalkanals were characterized by infrared spectroscopy and nuclear magnetic resonance study.

EXAMPLE 1

11 g of cyclohexyl hydroperoxide (purity: 98.7 percent) are gradually introduced into 41 g of anhydrous formic acid previously heated to the boil, over the course of 15 minutes.

The mixture is cooled to ambient temperature and 250 cm³ of cyclohexane are then added thereto. The solution obtained is then heated to the boil and the excess formic acid is driven off in the form of a binary azeotrope with cyclohexane (boiling point = 71° C.).

The residual mixture is subjected to fractional distillation during which 6.3 g of 6-formyloxy-hexanal (b.p. 91° — 92° C./ 8 mm. Hg.) are isolated.

Additionally, 2.6 g of cyclohexanone and 1.3 g of cyclohexyl formate are collected.

The 6-formyloxy-hexanal can be converted into 1,6-hexanediol as follows: 14 g of 6-formyloxy-hexanal prepared as indicated above are dissolved in 50 cm³ of dioxane. 2 g of Raney Nickel are added to this solution and the whole is then introduced into a stainless steel autoclave, stirred by shaking, in which a hydrogen pressure of 20 bars is established. The autoclave is then heated to 125° C. and kept under these conditions for 4 hours. After cooling and release of the gas, the catalyst is decanted and the final solution is then stirred with 10 cm³ of 10 N sodium hydroxide solution. Ethanol is then added until the mixture is homogeneous, and vapor phase chromatography shows that the final mixture contains 9.3 g of 1,6-hexanediol.

EXAMPLE 2

The procedure of Example 1 is followed, starting from 117 g of formic acid and replacing the cyclohexyl hydroperoxide by 40.65 g of cyclooctyl hydroperoxide (purity: 84.5 percent).

Finally, 12.7 g of 8-formyloxy-octanal are collected (b.p. 93° — 95° C./1.5 mm. Hg.). Additionally, 12.6 g of cyclooctanone and 5 g of cyclooctyl formate are collected.

EXAMPLE 3

The operations described in Example 1 are repeated, replacing the cyclohexyl hydroperoxide by 28.6 g of cyclododecyl hydroperoxide of 69.5% purity.

9.1 g of 12-formyloxy-dodecanal (b.p. 130° — 135° C./0.8 mm. Hg.) are finally isolated. Additionally, 10.3 g of cyclododecanone and 3.8 of cyclododecyl formate are collected.

We claim:
1. A process for the preparation of an ω-formyl-oxyalkanal of the formula

$$HCO \cdot O(CH_2)_n CHO$$

in which $n$ represents an integer from 5 to 11 which comprises reacting formic acid, which does not contain more than 5 percent by weight of water, with a cycloalkyl hydroperoxide of the formula

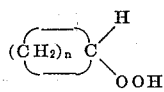

in which $n$ represents an integer from 5 to 11, the reaction being carried out at a temperature between 50° C and the boiling point of formic acid.

2. A process according to claim 1 in which 5—25 mols of formic acid are admixed per mol of the cycloalkyl hydroperoxide.

3. A process according to claim 1 in which after the reaction excess formic acid if any is removed by adding a hydrocarbon and distilling off a binary azeotrope of the hydrocarbon and formic acid.

4. A process according to claim 3 in which the hydrocarbon is benzene, toluene, pentane, hexane, heptane or cyclohexane.

* * * * *

UNITED STATES PATENT OFFICE
CERTIFICATE OF CORRECTION

PO-1050 (5/69)

Patent No. 3,689,534      Dated September 5, 1972

Inventor(s) JEAN-CLAUDE BRUNIE et al

It is certified that error appears in the above-identified patent and that said Letters Patent are hereby corrected as shown below:

In the heading, insert -- Claims priority, FRANCE    169,638    October 11, 1968. --

Signed and sealed this 24th day of April 1973.

(SEAL)
Attest:

EDWARD M. FLETCHER, JR.
Attesting Officer

ROBERT GOTTSCHALK
Commissioner of Patents